(12) United States Patent
Lazoglu et al.

(10) Patent No.: US 11,169,036 B2
(45) Date of Patent: Nov. 9, 2021

(54) MONOLITHIC FLEXURE BASED, TRIAXIAL DYNAMOMETER USING PHOTOINTERRUPTERS

(71) Applicant: KOC UNIVERSITESI, Istanbul (TR)

(72) Inventors: Ismail Lazoglu, Istanbul (TR); Sertac Guneri Yazgi, Istanbul (TR); Omer Subasi, Istanbul (TR)

(73) Assignee: KOC UNIVERSITESI, Istanbul (TR)

( * ) Notice: Subject to any disclaimer, the term of this patent is extended or adjusted under 35 U.S.C. 154(b) by 56 days.

(21) Appl. No.: 16/766,185

(22) PCT Filed: Nov. 22, 2017

(86) PCT No.: PCT/TR2017/050585
§ 371 (c)(1),
(2) Date: May 21, 2020

(87) PCT Pub. No.: WO2019/103700
PCT Pub. Date: May 31, 2019

(65) Prior Publication Data
US 2020/0363275 A1    Nov. 19, 2020

(51) Int. Cl.
*G01L 5/16* (2020.01)
*G01L 1/24* (2006.01)

(52) U.S. Cl.
CPC .  *G01L 1/24* (2013.01); *G01L 5/16* (2013.01)

(58) Field of Classification Search
CPC .................................... G01L 1/24; G01L 6/16
USPC .................................................... 73/862.624
See application file for complete search history.

(56) References Cited

U.S. PATENT DOCUMENTS

| 5,317,916 A | * | 6/1994 | Kovacevic | ............. | A61B 5/225 |
| | | | | | 482/49 |
| 6,038,933 A | * | 3/2000 | Meyer | .................. | G01L 1/2206 |
| | | | | | 73/862.045 |
| 2004/0261544 A1 | | 12/2004 | Peshkin | | |
| 2011/0129320 A1 | | 6/2011 | Duchaine et al. | | |

FOREIGN PATENT DOCUMENTS

| DE | 19610692 A1 | * | 9/1997 | ................ F16F 1/10 |
| DE | 19610692 A1 | | 9/1997 | |
| KR | 20140125059 A | * | 10/2014 | |
| KR | 20140125059 A | | 10/2014 | |

OTHER PUBLICATIONS

Translation of DE-19610692-A1 (Year: 1997).*
Translation of KR-20140125059-A (Year: 2014).*

* cited by examiner

*Primary Examiner* — Nathaniel T Woodward
(74) *Attorney, Agent, or Firm* — Bayramoglu Law Offices LLC

(57) ABSTRACT

A monolithic triaxial dynamometer for machining applications comprising one flexure frame with three flexural arms and three light blocking extensions protruding three different photointerrupter sensors housed in specially designated sensor placement slots situated on the sensor stand, the bottom of which lands on the floor of the external mounting structure, which is aligned and connected with the said top flexure frame using first and third group screw holes, thus bringing together a dynamometer used for force sensing in various industrial applications.

20 Claims, 3 Drawing Sheets

MONOLITHIC FLEXURE BASED, TRIAXIAL DYNAMOMETER USING PHOTOINTERRUPTERS

CROSS REFERENCES TO THE RELATED APPLICATIONS

This application is the national phase of International Application No. PCT/TR2017/050585, filed on Nov. 22, 2017, the entire contents of which are incorporated herein by reference.

TECHNICAL FIELD

The invention presented hereby generally concerns a force transducer/dynamometer that includes a flexure as a load-bearing element which is displaced under strain or a force applied. The force that causes the load to be displaced—or deflected in this case, is translated into meaningful data that helps the said force to be determined using various methods such as piezoelectricity, mechanics or in this particular case, photoelectricity. Significance of these instruments are marked in their usage to prevent machinery or systems in general from possible overloads, therefore keeping systems secure from operational hazards at large.

BACKGROUND

Many engineering applications from refined manufacturing methods to power plants include sophisticated and intricate machinery, and since interfacing surfaces of materials can only exist under the condition of a certain and persistent act of force upon a multiplicity of surfaces and elements, it is imperative that the conditions whereupon these acts of force take place are put under scrutiny and control. For one widely used example it will be legitimate to include force sensors, which are utilized in a variety of fields.

Force sensing is in itself a communication method and peripheral feedback utility, enabling the control mechanisms thereof be handled in a precise manner and efficiency. Force sensing methods on a different aspect, can be conceived as being of different proportions and technical rigor, ending up with the price range to extend greatly. Present invention is purported to have a relatively smaller unit cost, therefore it can be asserted that the present invention also aims to provide a much more easily available solution to dynamometer applications, all the while not compromising the targeted integrity and desired level of performance.

Prior art documents regarding the present invention are gathered with respect to the force sensing technique addressed therein. For example, the document denoted with the publication number KR20140125059 (A) includes the use of a photointerrupter, however its movement is confined to a single axis and the lack of flexures notwithstanding, this file appears closest in means of force sensing mechanism. DE19610692 (A1) defines a piezoelectricity based force sensing scheme that includes four flexures, which makes it the closest application file to the present invention design-wise. Other prior art documents such as US2011129320 (A1) provide close design specifications as well as the relevance of force sensing method, albeit the force sensing is not done with the use of a monolithic flexure; rather, it has three different modules one specified for every three dimensional axis.

This indicates that, although different disclosures and different embodiments have displayed the use and utilization of different aspects of the force sensing mechanisms, present invention is advantageous in the sense of triaxial monolithic flexure design and the use of three separate photointerrupters as the primary force sensing mechanism, as it is proposed to enhance the reliability and accuracy of the present, established mechanisms of actions and utilities thereof.

A primary object of the present invention is to provide a dynamometer; a system for the detection of a given force exerting on a space/location using photointerrupters at three dimensional axes.

SUMMARY

Basic principle of the dynamometer in the present invention rests on the premise that, a displacement or perturbance caused by an object on a sensory element calibrated appropriately to deduce force causing the displacement of the said object may be used to develop a mechanism for force detection in industrial activities such as high speed micromilling applications.

A photointerrupter sensor is an electronic device which consists of a light emitter, LED to transmit the light and a light-sensitive receiver. The beam of light travels across a gap and is picked up by the receiver on the other end of the said gap. This transparent gaps can be disturbed by a combination of light blockers which can change the phototransistor output, resulting in a means to deduce environmental changes caused by an external force, in this case the force acted upon the force exertion point of the top flexure.

The central part of the invention comprises a top flexure with a peculiar three-way design exhibiting radial symmetry that enables the force exerted to be distributed evenly across its entirety such that potential calibration errors that can pose a threat to the reading process do not occur. The design is marked with a central mass, also acting as the force exertion point and triaxially extends up to the periphery metal frame in c-shapes. This build results in bent droplet-shaped openings that cover the metal surface in a balanced, fan-like formation. Furthermore, this ensures the even distribution of the exerted force on the entirety of the monolithic flexure. Near the center of each of these droplet-shaped openings lie light blockers which firmly enter the photointerrupters' cavities in their designated locations; which are predetermined so as to cover the entirety of the three-dimensional space.

Directly below this said flexure is the sensor stand that accommodates all three sensors, all of which land on mounts positioned accordingly, and are fixed with the use of pins. The rectangular prism bottom case that follows on below has two extrusions at the sides, each having two groove holes that allow mounting on surfaces with the aid of screws. The singleton hole on the sidewall of the bottom case allow for running wires that protrude outside of the device.

BRIEF DESCRIPTION OF THE DRAWINGS

Accompanying drawings are given solely for the purpose of exemplifying a triaxial dynamometer, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

REFERENCE LIST

Figure 1:
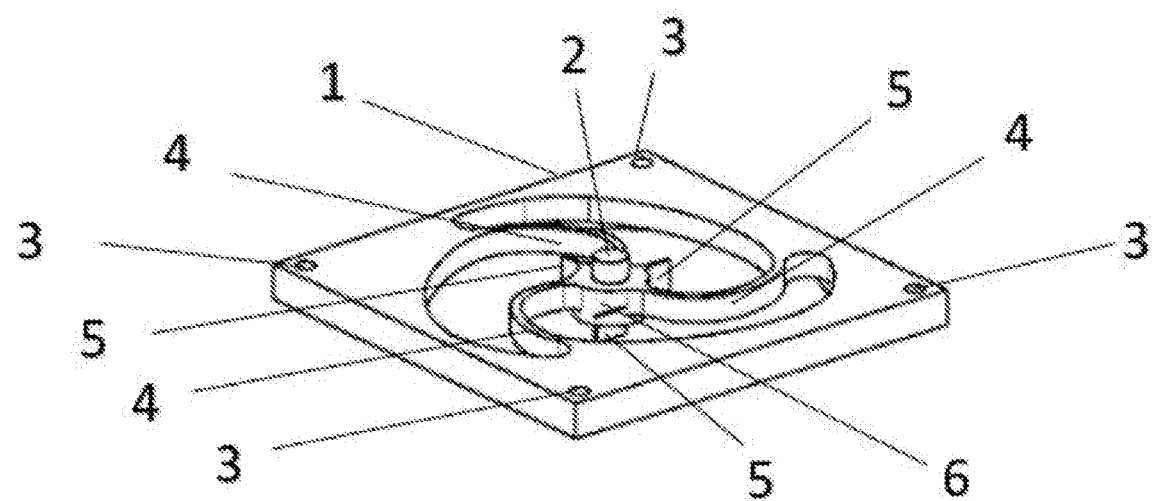
FIG. 1 demonstrates the isometric view of the triaxial flexure according to the invention.
Figure 2:
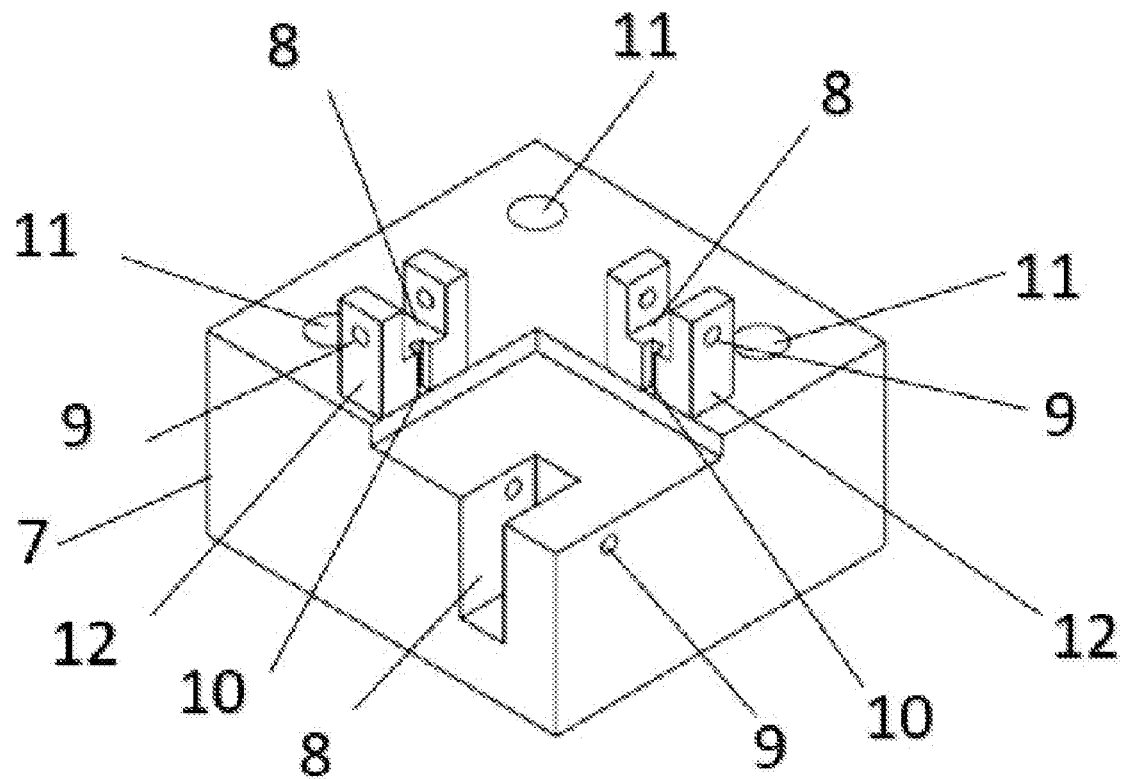
FIG. 2 demonstrates isometric view of the photointerrupter sensor stand that is meant to accommodate three photointerrupters according to the present invention.
Figure 3:
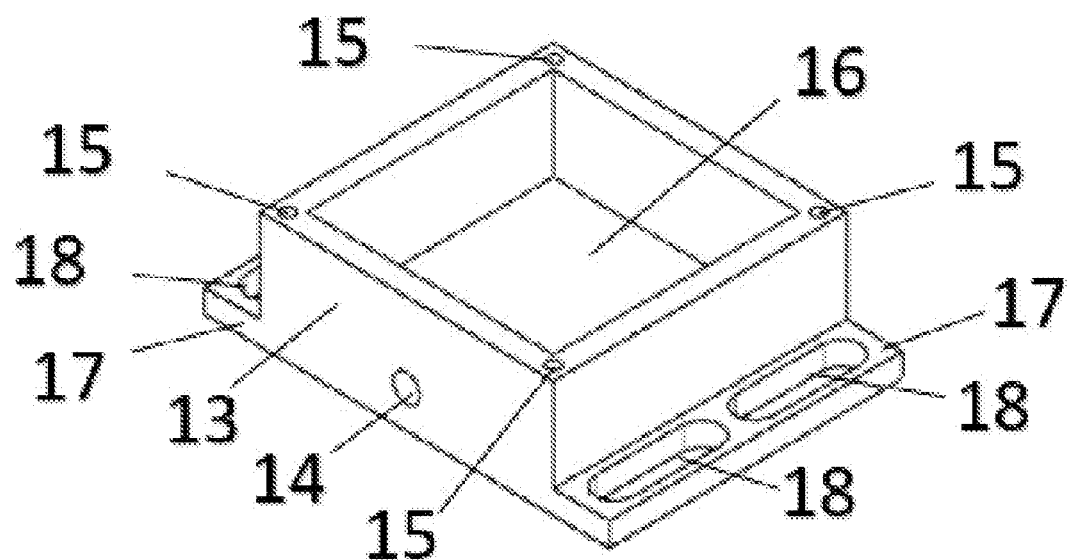
FIG. 3 demonstrates isometric view of the bottom case that supply the base of the invention according to the present invention.
Figure 4:
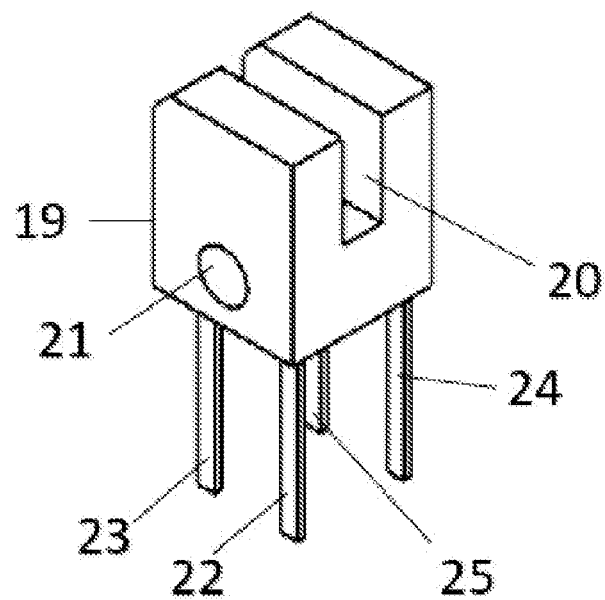
FIG. 4 demonstrates isometric view of the photointerrupter sensor according to the present invention.

1) Top flexure frame
2) Force exertion point
3) First group screw holes
4) Flexural arm
5) Light blocking structure
6) Joining structure
7) Sensor stand
8) Sensor placement slot
9) Sensor fixing pinhole
10) Light blocker clearance groove
11) Second group screw holes
12) Sensor mount structure
13) Bottom case
14) Wiring hole
15) Third group screw holes
16) Floor
17) External mounting structure
18) Fastening groove hole
19) Photointerrupter sensor
20) Light transmission gap
21) Mounting hole
22) Anode
23) Cathode
24) Collector
25) Emitter

DETAILED DESCRIPTION OF THE EMBODIMENTS

The present invention discloses a triaxial dynamometer; a force sensor comprising a top flexure frame (1) having one force exertion point (2) and three flexural arms (4) separated with still three droplet-shaped openings. Three light blocking structures (5) extend from the center of the said top flexure frame (1) entering the light transmission gaps (20) of three photointerrupter sensors (19) fixated on sensor placement slots (8) positioned on the sensor stand (7) which is situated atop the floor (16) of the bottom case (13).

The top flexure frame (1) is designed to include three light blocking structures (5) surrounding the immediacy of its force exertion point (2) around the joining structure (6) protruding specifically to be embedded inside the reciprocating photointerrupter sensors (19), representing movement and displacement in all three dimensions. When a designated force exerts on the force exertion point (2) on the top flexure frame (1), three flexural arms (4) bend and therefore disrupt the normal, id est precalibrated position of the light blocking structures (12), causing the light flow inside the light transmission gaps (20) of the said photointerrupter sensors (19), therefore providing means for the interpretation thereof as an external force acting thereupon.

Photointerrupter sensors (19) used in the present invention have specially designated slots (8) to which they are placed and attached using pinholes (9). The same structure which includes these parts, namely the sensor stand (7) also has light blocker clearance grooves (10) for the free and appropriate protrusion of said light blocking structures (12) if force exerted is large enough. Still on the same structure lie fixing holes that bring together the sensor stand (7) and the bottom case (13) as a whole by the potential use of screws.

Previously mentioned parts, them being the top flexure frame (1) and the sensor stand (7) are typically housed inside a bottom case (13) which also provide the means of the entirety of the present invention to be attached to any given horizontal surface with the aid of the groove holes (18) on its external mounting structure (17) that enable fastening. Said bottom case (13) further includes four third group screw holes (15) to fix the said top flexure frame (1) hereon, which itself includes first group screw holes (3) that perfectly align with aforementioned third group screw holes (15). There also exists a space, floor (16), that houses the sensor stand (7) and the corresponding wiring which is also enabled to leave the premises through an apt wiring hole (14) driven through the front side of said bottom case (13).

The top flexure frame (1) is preferably monolithically manufactured from aluminum 7075, as in its prototype testing phase, although the production thereof is not strictly confined to this parameter as different aluminum types or even different structural steels and polymers are bound to give different stiffness and bandwidth characteristics deemed desirable for different settings or areas of application. Said top flexure frame (1), considering the top view, has three resilient, c-shaped flexural arms (4) extending from its center towards the edge, equidistant from one another at any point. Said flexural arms (4) in turn create three openings that resemble skewed droplets that are identical in shape. This balanced design spreading out in a fan-like fashion ensures the equal distribution of the said exerted force upon the entirety of the said top flexure frame (1), facilitating and stabilizing the force sensing process altogether.

The force exertion point (2) is a crucial structure as the calibration of the present invention has to be carried out by loading the structure with known weights that will exert force on this point with precision. As present invention's designated area of use is for force sensing applications, especially cutting and milling operations; workpieces to be machined and measured must be able to be mounted on top of the invented dynamometer. In other alternative embodiments of present invention, a cover structure is incorporated that is attached to the force exertion point (2), which allows workpieces to be mounted on top of the dynamometer. Furthermore, since the top flexure frame (1) is a component that is easily replaceable, in other embodiments of the design, the flexural arms of the said top flexure frame (1) can have varying geometries and curvatures with still varying stiffness for the desired application of the dynamometer.

The minimum set of elements that require being conceived as acting together for sensing force is as follows: Top flexure frame (1) with its light blocking structures (5) that lie between its perimeter and the force exertion point (2) at the radial center, and photointerrupter sensors (19) into the light transmission gaps (20) of which said light blocking structures (5) extend. At any occasion an object comes into contact with the force exertion point (2) of said top flexure frame (1), flexural arms (4) extending from the center towards the periphery experience a load they bend to differing extents thereunder. Unless the force exerted on the force exertion point (2) is perfectly towards the center of the earth and therefore introducing an equilateral extension, at least two, if not every single one, of the flexural arms (4) will have different torsion levels. Such outcome will be translated to the light blocking structures (5) inducing varying perturbance degrees on the photointerrupter sensors (19), maintaining the input for ascertaining the three-dimensional constitution of the force under scrutiny. Obtaining the readings and processing them could be handled by a data acquisition system based unit, as was the case in the prototype phase.

Figure 5:
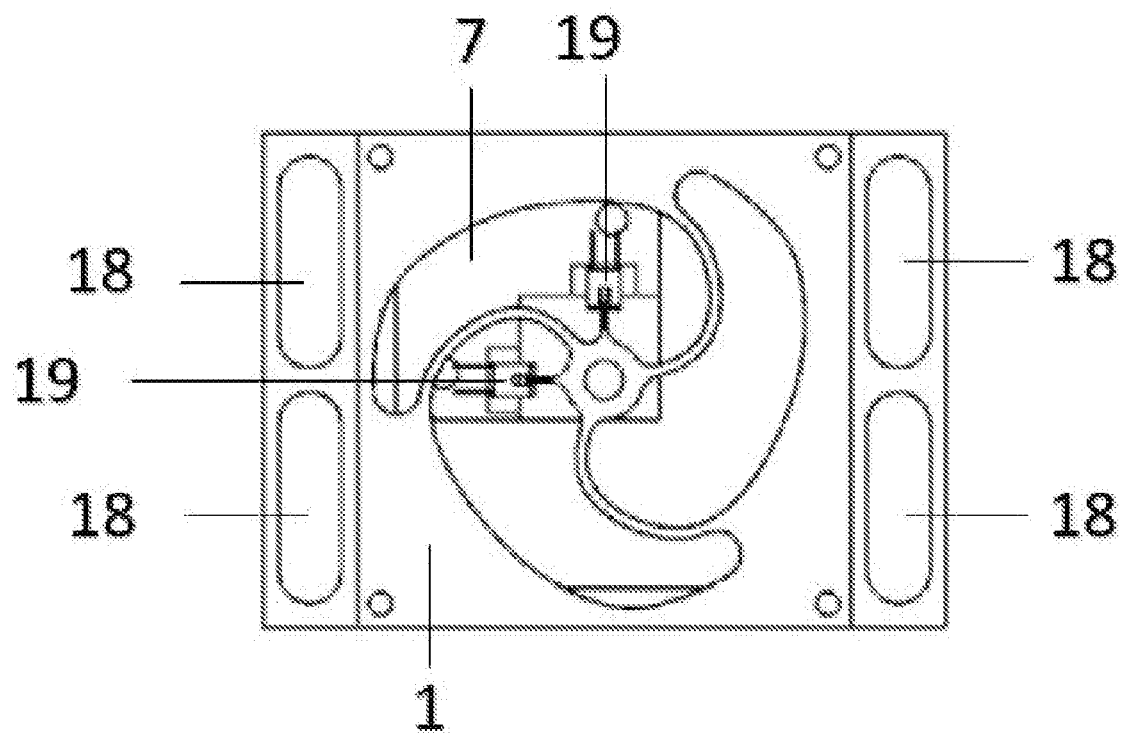
FIG. 5 demonstrates the top view of the triaxial dynamometer unit in its entirety according to the present invention.
Figure 6:
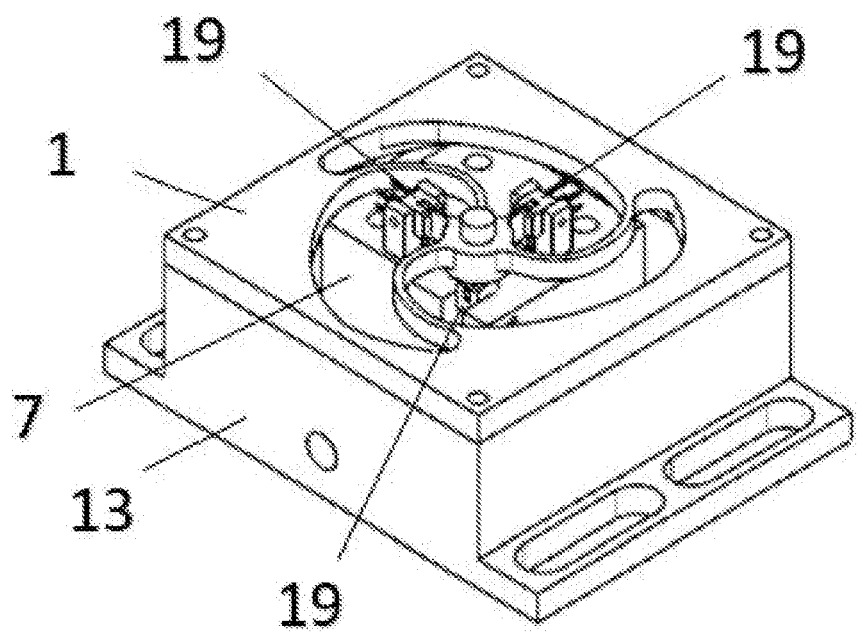
FIG. 6 demonstrates isometric view of the triaxial dynamometer unit in its entirety according to the present invention.

Particular functionality of the present invention is realized when top flexure frame (1) is mounted on the bottom case (13) while said bottom case (13) accommodates the sensor stand (7) in a manner to have the bottom of the said sensor stand (7) touch the designated floor (16) therein. This intended assembly constitutes for the form seen in FIG. 5 and FIG. 6, alternative assembly thereof is not conceived, therefore not possible; underlining the strong relationship between structural and functional aspects of present invention.

External mounting structure (17) at the bottom of the said bottom case (13) is preferably situated on a perfectly flat surface so as to avoid any orientational deviation, as any disturbance or distortion of the surface said external mounting structure (17) will be fastened on will be translated upwards along with the shape of said bottom case (13), in turn impairing the force sensing process. Fastening groove holes (18) on said external mounting structure (17) enable the fixation of bottom case (13) after which calibration process is ready to commence.

In a nutshell, the present invention proposes a monolithic, flexure-based triaxial dynamometer comprising one top flexure frame (1) at the center of which a force exertion point (2) exists that holds three flexural arms (4) as well as three light blocking structures (5), mounted on an bottom case (13) that houses a sensor stand (7) with designated sensor placement slots (8) photointerrupter sensors (19) are inserted within; via the utilization of first group screw holes (3) and the third group screw holes' (15) appropriate alignment and therefore the entirety of the dynamometer is realized.

In one aspect of the present invention, a flexure based, triaxial dynamometer is proposed, comprising one monolithic top flexure frame (1) with flexural arms (4) that meet at a central force exertion point (2) in the proximity of which light blocking structures (5) exist.

In a further aspect of the present invention, said top flexure frame (1) is in operationally aligned position with an external sensor stand (7) such that said light blocking structures (5) respectively cooperate with three photointerrupter sensors (19) of said triaxial dynamometer, said photointerrupter sensors (19) being disposed in designated sensor placement slots (8) on said sensor stand (7), light transmission gaps (20) of said photointerrupter sensors (19) appropriately housing the light blocking structures (5) so that force sensing setup is consolidated in operationally assembled position of the triaxial dynamometer.

In a further aspect of the present invention, said top flexure frame (1) is configured as a solitary, monolithic and removable part.

In a further aspect of the present invention, three light blocking structures (5) are positioned in relation to one another in a manner so as to represent three-dimensional Euclidean space.

In a further aspect of the present invention, at least one of the axes of light blocking structures (5) is perpendicular to the plane formed by the axes of the remaining light blocking structures (5).

In a further aspect of the present invention, at least one of said sensor placement slots (8) is situated in a recessed area extending into the body of the sensor stand (7) to accommodate a vertically downwards extending light blocking structure (5).

In a further aspect of the present invention, said bottom case (13) includes an extension in the form of an external mounting structure (17) that facilitates the horizontal fixation of the dynamometer via fastening groove holes (18).

In a further aspect of the present invention, the sensor stand (7) is reposed on one corner of the bottom case (13), and the remaining space inside said bottom case (13) is unoccupied.

In a further aspect of the present invention, the photointerrupter sensor (19) accommodating the vertically extending light blocking structure (5) align with the radial center of the top flexure frame (1).

In a further aspect of the present invention, at least a certain upper area portion of the sensor stand (7) is configured on a lower level in relation to the rest of its surface to enable the vertical positioning of the photointerrupter sensor (19) that houses still vertical light blocking structure (5).

In a further aspect of the present invention, horizontal light blocking structures (5) lie perpendicularly with respect to one another, with their bodies protruding towards the areas of droplet-shaped openings on the top flexure frame (1) that have greater cross-sectional area.

What is claimed is:

1. A flexure based, triaxial dynamometer comprising one monolithic top flexure frame with flexural arms that meet at a central force exertion point in the proximity of which light blocking structures exist wherein;
    said top flexure frame is in operationally aligned position with an external sensor stand such that said light blocking structures respectively cooperate with three photointerrupter sensors of said triaxial dynamometer, said photointerrupter sensors being disposed in designated sensor placement slots on said sensor stand, light transmission gaps of said photointerrupter sensors appropriately housing the light blocking structures so that a force sensing setup is consolidated in an operationally assembled position of the triaxial dynamometer.

2. The flexure based, triaxial dynamometer as set forth in claim 1, wherein said top flexure frame is configured as a solitary, monolithic and removable part.

3. The flexure based, triaxial dynamometer as set forth in claim 2, wherein three light blocking structures are positioned in relation to one another in a manner so as to represent three-dimensional Euclidean space.

4. The flexure based, triaxial dynamometer as set forth in claim 2, wherein at least one of said sensor placement slots is situated in a recessed area extending into the body of the sensor stand to accommodate a vertically downwards extending light blocking structure.

5. The flexure based, triaxial dynamometer as set forth in claim 2, wherein the sensor stand is reposed on one corner of the bottom case, and the remaining space inside said bottom case is unoccupied.

6. The flexure based, triaxial dynamometer as set forth in claim 2, wherein at least a certain upper area portion of the sensor stand is configured on a lower level in relation to the rest of its surface to enable the vertical positioning of the photointerrupter sensor that houses still vertical light blocking structure.

7. The flexure based, triaxial dynamometer as set forth in claim 2, wherein horizontal light blocking structures lie perpendicularly with respect to one another, with the bodies thereof protruding towards the areas of droplet-shaped openings on the top flexure frame that have greater cross-sectional area.

8. The flexure based, triaxial dynamometer as set forth in claim 1, wherein three light blocking structures are positioned in relation to one another in a manner so as to represent three-dimensional Euclidean space.

9. The flexure based, triaxial dynamometer as set forth in claim 8, wherein at least one of the axes of light blocking structures is perpendicular to the plane formed by the axes of the remaining light blocking structures.

10. The flexure based, triaxial dynamometer as set forth in claim 9, wherein horizontal light blocking structures lie perpendicularly with respect to one another, with the bodies thereof protruding towards the areas of droplet-shaped openings on the top flexure frame that have greater cross-sectional area.

11. The flexure based, triaxial dynamometer as set forth in claim 8, wherein at least one of said sensor placement slots is situated in a recessed area extending into the body of the sensor stand to accommodate a vertically downwards extending light blocking structure.

12. The flexure based, triaxial dynamometer as set forth in claim 8, wherein the sensor stand is reposed on one corner of the bottom case, and the remaining space inside said bottom case is unoccupied.

13. The flexure based, triaxial dynamometer as set forth in claim 8, wherein at least a certain upper area portion of the sensor stand is configured on a lower level in relation to the rest of its surface to enable the vertical positioning of the photointerrupter sensor that houses still vertical light blocking structure.

14. The flexure based, triaxial dynamometer as set forth in claim 8, wherein horizontal light blocking structures lie perpendicularly with respect to one another, with the bodies thereof protruding towards the areas of droplet-shaped openings on the top flexure frame that have greater cross-sectional area.

15. The flexure based, triaxial dynamometer as set forth in claim 1, wherein at least one of said sensor placement slots is situated in a recessed area extending into the body of the sensor stand to accommodate a vertically downwards extending light blocking structure.

16. The flexure based, triaxial dynamometer as set forth in claim 1, wherein said bottom case includes an extension in the form of an external mounting structure that facilitates the horizontal fixation of the dynamometer via fastening groove holes.

17. The flexure based, triaxial dynamometer as set forth in claim 1, wherein the sensor stand is reposed on one corner of the bottom case, and the remaining space inside said bottom case is unoccupied.

18. The flexure based, triaxial dynamometer as set forth in claim 17, wherein the photointerrupter sensor accommodating the vertically extending light blocking structure aligns with the radial center of the top flexure frame.

19. The flexure based, triaxial dynamometer as set forth in claim 1, wherein at least a certain upper area portion of the sensor stand is configured on a lower level in relation to the rest of its surface to enable the vertical positioning of the photointerrupter sensor that houses still vertical light blocking structure.

20. The flexure based, triaxial dynamometer as set forth in claim 1, wherein horizontal light blocking structures lie perpendicularly with respect to one another, with the bodies thereof protruding towards the areas of droplet-shaped openings on the top flexure frame that have greater cross-sectional area.

* * * * *